(12) United States Patent
Kersting et al.

(10) Patent No.: US 8,522,860 B2
(45) Date of Patent: Sep. 3, 2013

(54) FASTENING AND JOINING ELEMENT FOR HEAT EXCHANGERS, AND HEAT EXCHANGER ASSEMBLY IN A MOTOR VEHICLE

(75) Inventors: Dirk Kersting, Lippstadt (DE); Andre Schmidt, Hamm (DE); Walter Korte, Erwitte (DE)

(73) Assignee: HBPO GmbH, Lippstadt (DE)

( * ) Notice: Subject to any disclaimer, the term of this patent is extended or adjusted under 35 U.S.C. 154(b) by 1167 days.

(21) Appl. No.: 12/066,920

(22) PCT Filed: Aug. 31, 2006

(86) PCT No.: PCT/EP2006/008498
§ 371 (c)(1),
(2), (4) Date: Mar. 14, 2008

(87) PCT Pub. No.: WO2007/031197
PCT Pub. Date: Mar. 22, 2007

(65) Prior Publication Data
US 2008/0223550 A1      Sep. 18, 2008

(30) Foreign Application Priority Data
Sep. 15, 2005    (DE) .................... 10 2005 043 937

(51) Int. Cl.
F28F 9/00     (2006.01)
B60K 11/04    (2006.01)

(52) U.S. Cl.
USPC ............................. 165/67; 165/76; 180/68.4

(58) Field of Classification Search
CPC ..................................... B60K 11/04
USPC .............. 165/67, 69, 140, 76; 180/68.4, 68.6
See application file for complete search history.

(56) References Cited

U.S. PATENT DOCUMENTS

| | | | | |
|---|---|---|---|---|
| 3,121,467 | A * | 2/1964 | Bryant | 180/68.4 |
| 3,795,274 | A * | 3/1974 | Fieni | 165/122 |
| 4,141,420 | A * | 2/1979 | van der Lely | 172/49.5 |
| 4,538,697 | A * | 9/1985 | Muroi et al. | 180/68.4 |
| 5,271,473 | A * | 12/1993 | Ikeda et al. | 180/68.4 |
| 5,558,310 | A * | 9/1996 | Furuie et al. | 248/573 |
| 6,158,500 | A | 12/2000 | Heine | |
| 6,223,811 | B1 * | 5/2001 | Kodumudi et al. | 165/121 |
| 6,510,891 | B2 * | 1/2003 | Anderson et al. | 165/67 |
| 6,513,579 | B1 * | 2/2003 | Kent et al. | 165/67 |
| 6,675,921 | B2 * | 1/2004 | Brown | 180/68.4 |
| 7,040,380 | B1 * | 5/2006 | O'Brien | 165/67 |
| 2002/0007933 | A1 * | 1/2002 | Baumann et al. | 165/42 |
| 2002/0056541 | A1 * | 5/2002 | Kokubunji et al. | 165/67 |
| 2002/0157812 | A1 * | 10/2002 | Anderson et al. | 165/67 |
| 2005/0121170 | A1 | 6/2005 | Maeda et al. | |

FOREIGN PATENT DOCUMENTS

| | | |
|---|---|---|
| DE | 297 12 351 U1 | 9/1997 |
| DE | 601 00 953 T2 | 8/2004 |
| DE | 103 40 566 A1 | 3/2005 |
| DE | 10 2004 058 724 A1 | 7/2005 |
| EP | 1103398 A1 * | 5/2001 |
| EP | 1 319 579 B1 | 6/2003 |
| EP | 1 413 501 A1 | 4/2004 |

* cited by examiner

*Primary Examiner* — Tho V Duong
(74) *Attorney, Agent, or Firm* — Foley & Lardner LLP (57) ABSTRACT

The invention relates to a fastening and joining element (4) for fixing and connecting heat exchangers of a heat exchanger assembly in a motor vehicle. Said fastening and joining element (4) comprises at least one hole (4b) for positively accommodating a heat exchanger as well as a fastening part (4a) encompassing a profiled fastening member.

10 Claims, 7 Drawing Sheets

FASTENING AND JOINING ELEMENT FOR HEAT EXCHANGERS, AND HEAT EXCHANGER ASSEMBLY IN A MOTOR VEHICLE

The invention relates to a fastening and connecting element and to an arrangement of heat exchangers in a motor vehicle.

BACKGROUND

Arrangements of heat exchangers in a motor vehicle are known as so-called cooling modules, that is to say as a pre-assembled structural unit, which is for example composed of a coolant cooler, a refrigerant condenser, a charge-air cooler and/or an oil cooler which are cooled at the secondary side by ambient air. The cooling module can also be connected to a so-called assembly carrier and expanded to form a front module which includes additional components such as the headlights of the vehicle. A problem with cooling modules of said type is the fastening of the heat exchangers to one another and with respect to a module carrier or assembly carrier. If the heat exchangers have collecting tanks composed of plastic, that is to say for example coolant coolers, it is possible for fastening elements to be injection-molded, from plastic, onto the water tanks in simple manner. In other heat exchangers which are composed entirely of metal parts, for example fully-aluminum heat exchangers, said favorable fastening possibilities do not exist, and it is in fact necessary for brackets to additionally be fastened to the fully-metal heat exchangers, for example by means of soldering, which is expensive.

DE 601 00 953 T2 (EP 1 319 579 B1) has disclosed a front module for motor vehicles which comprises a frame-shaped assembly carrier which holds individual cooling components such as a coolant cooler and a condenser. Here, both heat exchangers are in each case supported and held with respect to the assembly carrier at their lower sides by means of support disks, while said heat exchangers are connected to the assembly carrier at their upper sides by means of clip connections in the form of additional metal clamps. A disadvantage of the known fastening is that the heat exchangers must be adapted specifically to the selected type of fastening, that is to say they must be provided with specific retaining pins.

EP 1 413 501 A1 has disclosed a further front module for motor vehicles which has an assembly carrier which is embodied as an open frame and which is closed off at its upper side by means of a movable cross member, a so-called drawbridge. A coolant cooler and a condenser are held in the assembly carrier, which coolant cooler and condenser are fastened with respect to the assembly carrier at their lower and upper sides in each case by means of support plates. Here, mounting pins which are attached to the heat exchangers engage into bores of the support plates. A disadvantage of said type of fastening is likewise that the heat exchangers must be fitted with additional fastening elements, in this case mounting pins, which makes the production of said heat exchangers more expensive.

DE 297 12 351 U1 has disclosed an arrangement of heat exchangers in a motor vehicle, a cooling module, composed of a coolant cooler and a refrigerant condenser. The coolant cooler is produced mechanically, that is to say it has a collecting or water tank composed of plastic which is mechanically connected to a tube plate by means of a crimped connection. Latching and retaining elements are injection-molded onto the plastic water tank, which latching and retaining elements serve for the fastening of further cooling components. The condenser is produced as a fully-aluminum heat exchanger with collecting tubes and collectors composed of aluminum materials. Fastening lugs in the form of sheet aluminum parts are soldered on to the condenser, that is to say on to its collecting tank, which fastening lugs are connected and latched to the injection-molded latching connection of the plastic water tank. A disadvantage of said solution is the additional structural and production-related expenditure which is necessary for the attachment of the additional retaining lugs to the condenser.

BRIEF SUMMARY OF THE INVENTION

It is an object of the present invention to create a simplified and cost-effective solution for fastening heat exchangers to one another and with respect to a carrier which is supported on the vehicle. It is also an object of the present invention to create, in an arrangement of heat exchangers in a motor vehicle, a simple and cost-effective fastening, with it being possible for the heat exchangers, in particular those of fully-aluminum design, to be used without it being necessary for further fastening means to be attached.

According to the invention, the fastening and connecting element is composed of a receiving opening, which receives a heat exchanger in a form-fitting manner, and a fastening part, by means of which the fastening and connecting element can be fastened to another part, for example to another heat exchanger or to an assembly carrier. The fastening part has a fastening profile, for example a U-shaped profile, which can be joined to a corresponding mating profile on a heat exchanger or on an assembly carrier and therefore generates a form-fitting action, in particular an anti-twist mechanism. The fastening profile can also be of box-shaped design, that is to say can have four contact faces which are arranged approximately at right angles to one another and which encompass a corresponding mating piece, a box-shaped stub. Said stub can advantageously be formed as a screw dome from plastic which is arranged and injection-molded either on a heat exchanger with plastic tanks or an assembly carrier composed of plastic. The fastening element is then additionally secured by means of a self-tapping screw which is screwed into the screw dome. The receiving opening of the fastening and connecting element is adapted to the heat exchanger which is to be fastened, for example to the collecting tube of a fully-aluminum condenser. The receiving opening is in effect embodied as a pocket which can be plugged at the end side onto the collecting tube of the condenser so as to be held without play. Said re-usable fastening and connecting element obtains the advantage of a simple and cost-effective fastening of two heat exchangers, in particular of a coolant cooler with plastic tanks and a fully-metal heat exchanger such as a condenser. The condenser requires no fastening means which must be additionally soldered on and can therefore be produced in a "fastening-neutral" fashion, which reduces the production costs of the condenser. The fastening projection, embodied in particular as a screw dome on the coolant cooler, is likewise simple and cost-effective to produce—it increases the production costs of the cooler to only an insignificant extent, or not at all.

According to one advantageous embodiment of the invention, the fastening and connecting element has two receiving openings which are arranged coaxially in series and which are divided at the end side by a partition. In this way, it is possible for the fastening and connecting element to be used for both end sides of the condenser, that is to say to be used in a "reversed" fashion.

According to a further advantageous embodiment of the invention, the fastening and connecting element has a second receiving opening which differs from the first receiving opening and which is arranged laterally adjacent to the first and is likewise embodied as a type of pocket. The second receiving opening is also adapted in terms of its profile to a further heat exchanger which is to be received, for example to a fully-aluminum heat exchanger which does not have a plastic water tank but rather an aluminum water tank. The latter is generally of approximately box-shaped design and can therefore be encompassed easily by a corresponding box-shaped profile of the receiving opening. Both receiving openings which are arranged adjacent to one another can therefore be pushed at the same time over the end sides of two heat exchangers which are arranged parallel to one another, and then hold the latter together in the manner of a clamp. With the fastening part, the fastening and connecting element can be fastened to an assembly carrier which preferably has a profiled screw dome. It is thereby possible for both heat exchangers to be connected to one another and fastened to the assembly carrier with minimal production expenditure. The fully-metal heat exchanger—like the condenser—therefore requires no additional fastening means.

In one advantageous embodiment of the invention, the fastening and connecting element is formed as a plastic injection-molded part, and can therefore be produced in a cost-effective manner and fits onto the heat exchanger as if "cast on", which ensures a play-free seat.

In a further advantageous embodiment of the invention, an elastic compensating element is arranged in one receiving opening, preferably in the larger receiving opening, which elastic compensating element is supported against the end side of the coolant tank. This creates tolerance compensation between the two heat exchangers, the coolant cooler and the condenser, which expand to different extents during operation.

The object of the invention is also achieved by means of an arrangement of heat exchangers which are connected to form a structural unit or a module and which are connected by means of the fastening elements according to the invention or are fastened to an assembly carrier of a front module. The fastening elements according to the invention are on the one hand suitable for the connection of heat exchangers of a cooling module which is composed of a mechanically joined heat exchanger with plastic tanks and a fully-metal heat exchanger. In addition, the enhanced design of the fastening and connecting element according to the invention with two receiving openings is particularly suitable for the connection of two fully-metal heat exchangers, for example a condenser and a coolant cooler, which are at the same time fastened to a module collier. In each case four connecting and fastening elements are preferably used, that is to say at the four corner points of the heat exchangers. The assembly of the heat exchangers is conceivably simple, since the fastening and connecting elements are merely pushed onto the end or corner regions of the heat exchangers from both sides in the manner of caps.

BRIEF DESCRIPTION OF THE DRAWINGS

Exemplary embodiments of the invention are illustrated in the drawing and are explained in more detail below.

In the drawing:

FIG. 3a,

DETAILED DESCRIPTION

Figure 1:
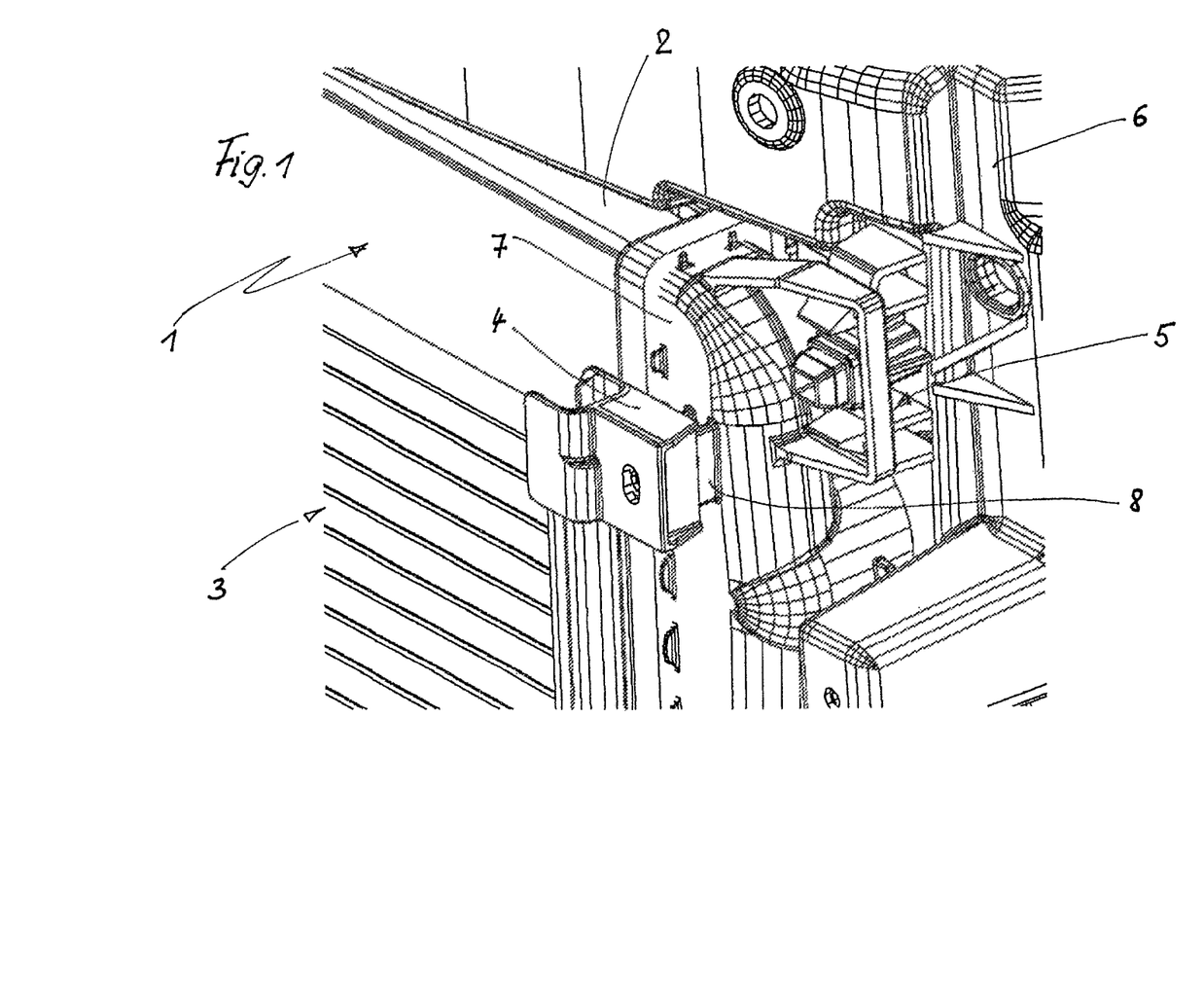
FIG. 1 shows a detail of a cooling module with a fastening and connecting element according to the invention (first exemplary embodiment)

FIG. 1 shows a detail of a cooling module 1 in an isometric illustration. The cooling module 1 is composed of a mechanically produced coolant cooler 2 and a soldered condenser of fully-aluminum design. The two heat exchangers 2, 3 are connected to one another by means of a fastening and connecting element 4, while the coolant cooler 2, referred to below for short as the cooler 2, is connected to a module or assembly carrier 6 by means of a latching connection 5 which is not explained in any more detail. The cooler 2 is therefore the carrier for the condenser 3, while the module carrier 6 is the carrier for the entire cooling module with respect to a motor vehicle (not illustrated). Instead of the module carrier 6, it is likewise possible for an assembly carrier of a front module (not illustrated) to be the carrier of the cooling module 1. The cooler 2 has a coolant tank 7 composed of plastic, on the longitudinal side, which faces toward the condenser 3, of which a screw dome 8 is injection-molded, which screw dome 8 is partially hidden by the fastening and connecting element 4 which is placed on and connected to it. The condenser 3 has a collecting tube 9 which is received and held in a form-fitting manner by the fastening and connecting element 4. In total—though this is not illustrated—four fastening and connecting elements 4 are provided for fastening the condenser 3 and cooler 2 to one another, specifically in each case—as illustrated—at the corner regions.

Figure 2:
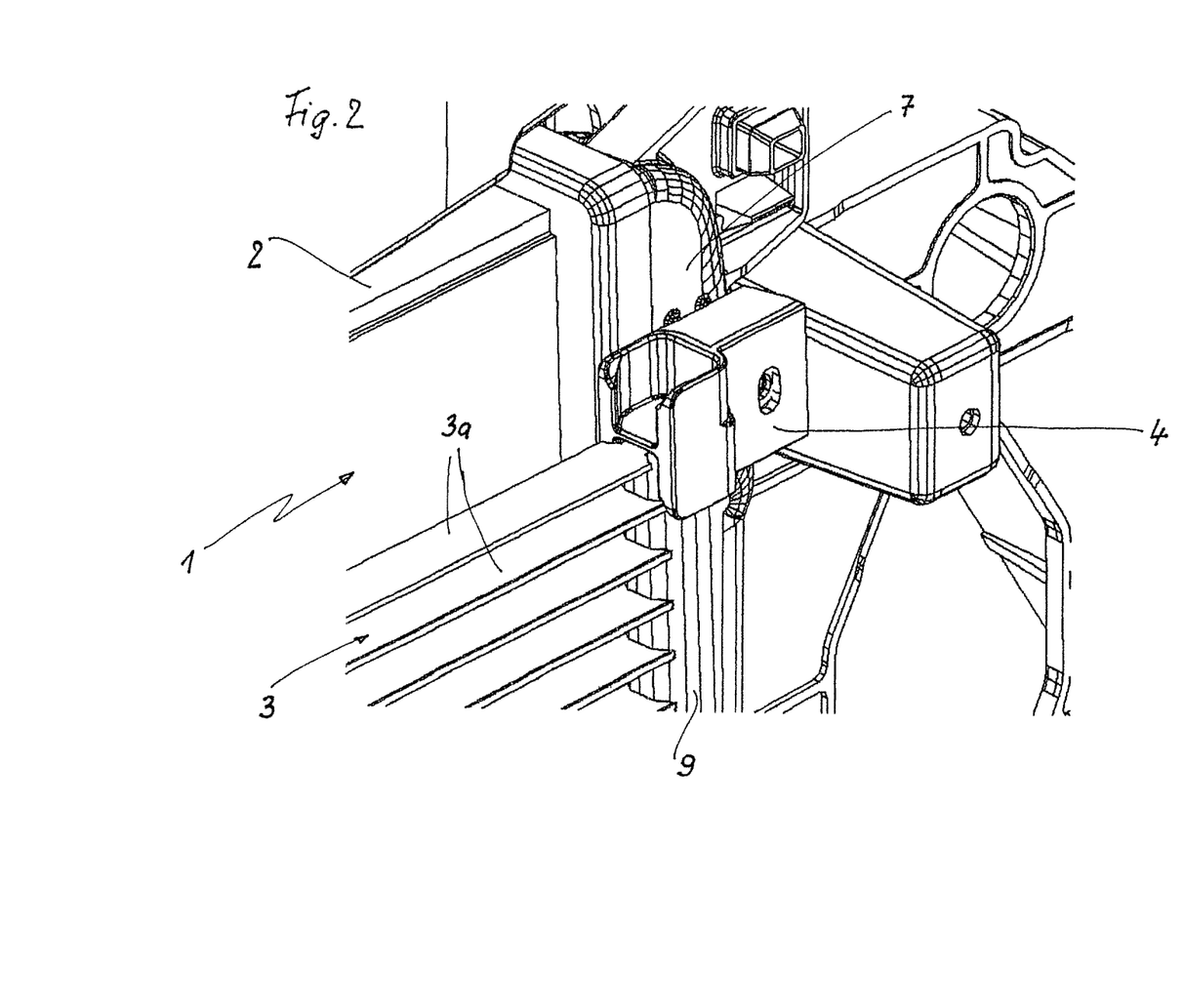
FIG. 2 shows a further detail of the cooling module as per FIG. 1.

FIG. 2 shows the cooling module 1 from another perspective, that is to say with a view directed at the underside of the collecting tube 9 and of the fastening and connecting element 4. The same reference symbols as those in FIG. 1 are used for identical parts. As can be seen from the illustration, the fastening and connecting element 4 surrounds the end-side end of the collecting tube 9 substantially on three sides, while the fourth, the lower side, on which flat tubes 3a are arranged, remains free. The geometry and function of the fastening and connecting element 4 is explained in more detail below.

Figure 3A:
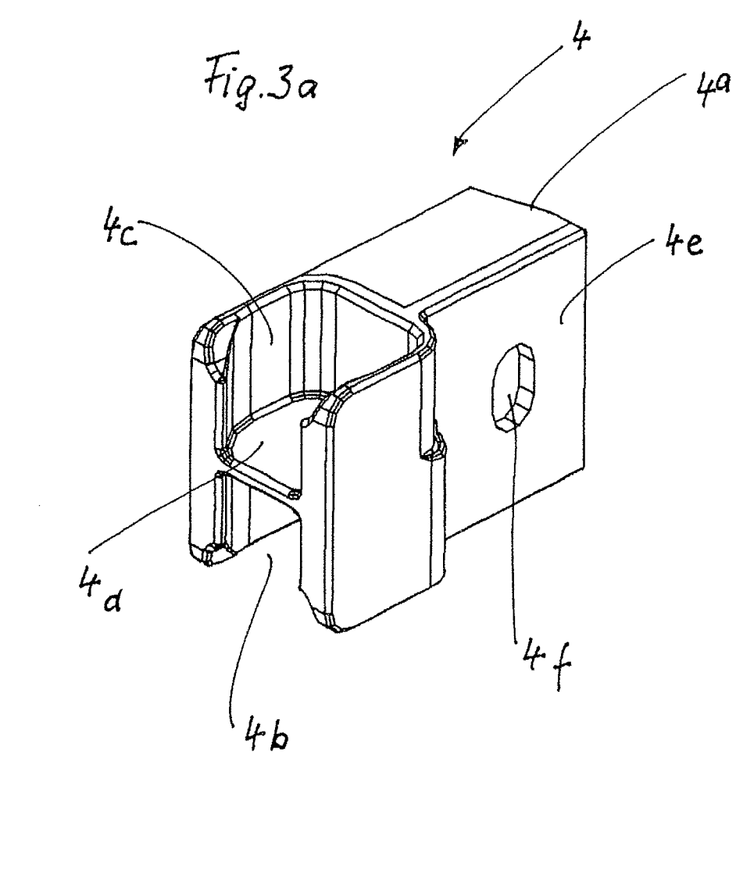
Figure 3B:
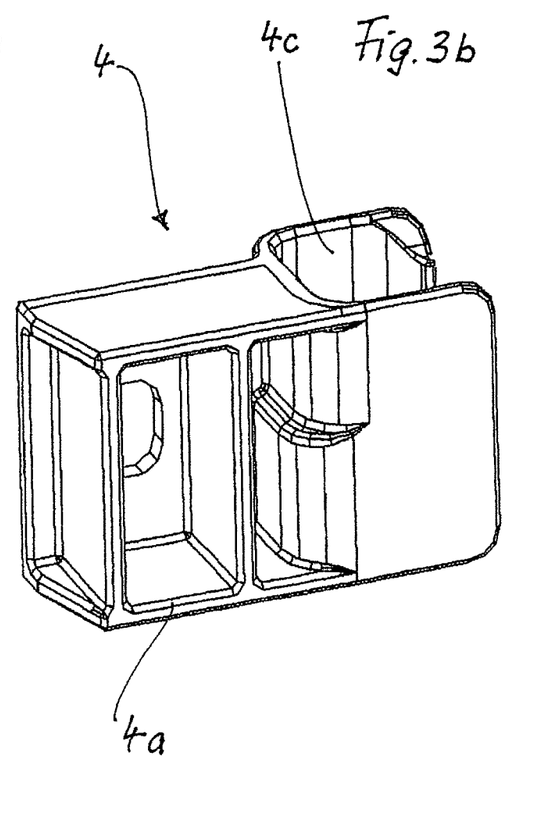
FIG. 3b show the fastening and connecting element according to the invention in different isometric illustrations.

FIG. 3a and FIG. 3b show the fastening and connecting element 4 (also referred to below for short as element 4) in two different perspectives as an individual part. The element 4 has, at one side, a box-shaped fastening part 4a and, at the other side, two receiving openings 4b, 4c which are arranged coaxially with respect to one another and which are divided from one another by a partition 4d and are open at the end side in opposite directions. The two receiving openings 4b, 4c have a profile which is approximately C-shaped and which is matched to the profile of the collecting tube 9 (cf. FIG. 2). In FIGS. 1 and 2, the receiving opening 4b receives the end-side end of the collecting tube 9 in a form-fitting manner. The fastening part 4a is designed as an open box with a base 4e in which is arranged an opening 4f formed as a slot. In FIG. 1 and FIG. 2, the box 4a is placed over the screw dome 8, is held in a form-fitting manner and is fastened to the coolant tank 7 by means of a self-tapping screw (not illustrated) which is inserted through the opening 4f. The element 4 can be used in a "reversed" fashion, that is to say both for the right-hand and also for the left-hand end side of the collecting tube 9, which end sides are received in the first case by the receiving opening 4b and in the other case by the receiving opening 4c. The support in the longitudinal direction of the collecting tube 9 takes place by means of the partition 4d. The element 4 can preferably be produced as a plastic injection-molded part.

Figure 4:
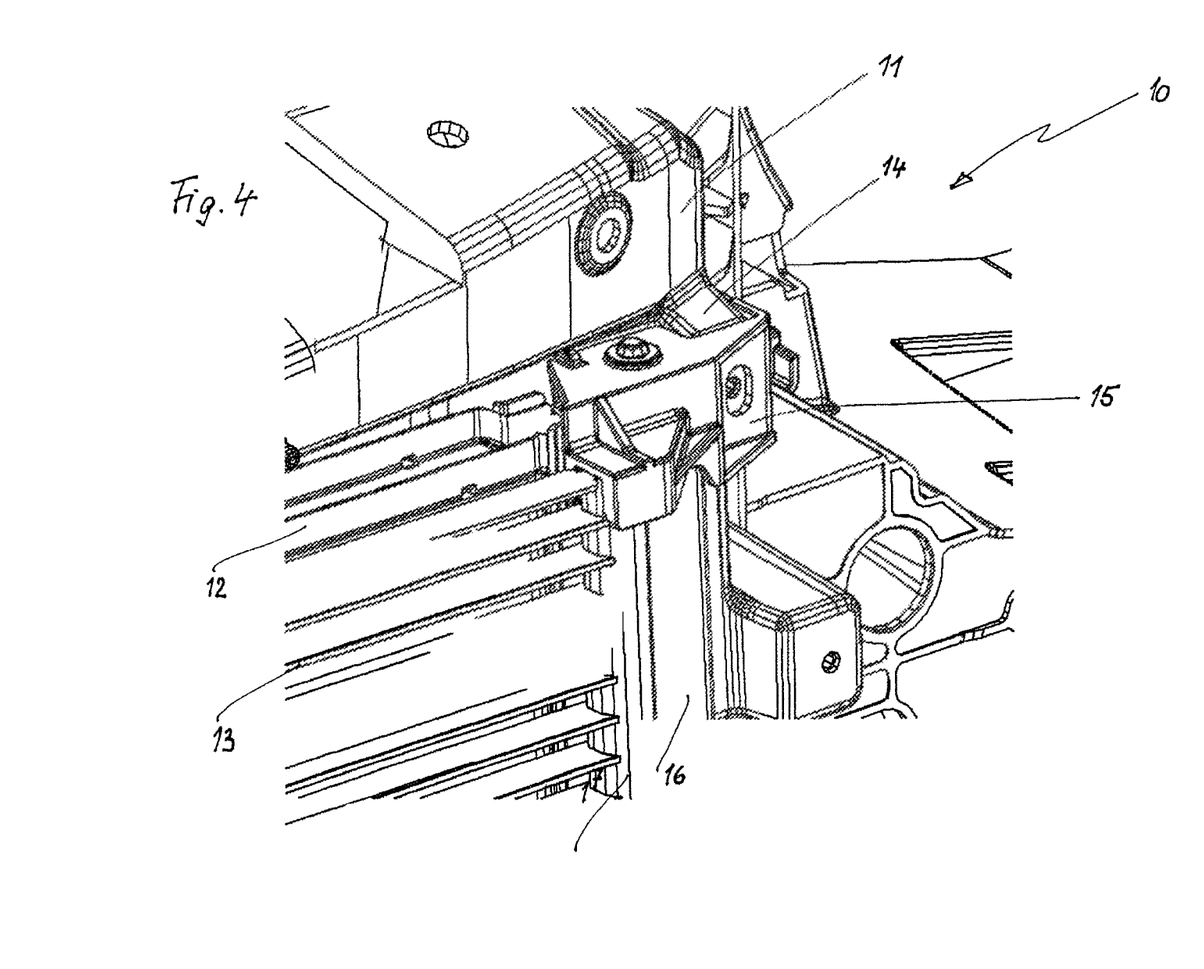
FIG. 4 shows a detail of a further cooling module with a second exemplary embodiment of the fastening and connecting element according to the invention.

FIG. 4 shows a further exemplary embodiment of the invention for a front module 10 which is illustrated as a detail in a 3-D illustration. An assembly carrier 11 of the front module 10 is the carrier of two heat exchangers, a fully-aluminum coolant cooler 12 and a fully-aluminum condenser 13—the two heat exchangers 12, 13 are thus fully soldered. The assembly carrier 11 can preferably be produced from plastic and has a screw dome 14 which is injection-molded on and to which a fastening and connecting element 15 (second embodiment) is fastened. The latter engages, with two receiving openings which are arranged adjacent to one another and which are to be explained below, over the corner regions of the two fully-metal heat exchangers 12, 13, with the fully-metal cooler 12 having an approximately box-shaped coolant tank 16 and the condenser 13 having a substantially round cylindrical collecting tube 17.

Figure 5:
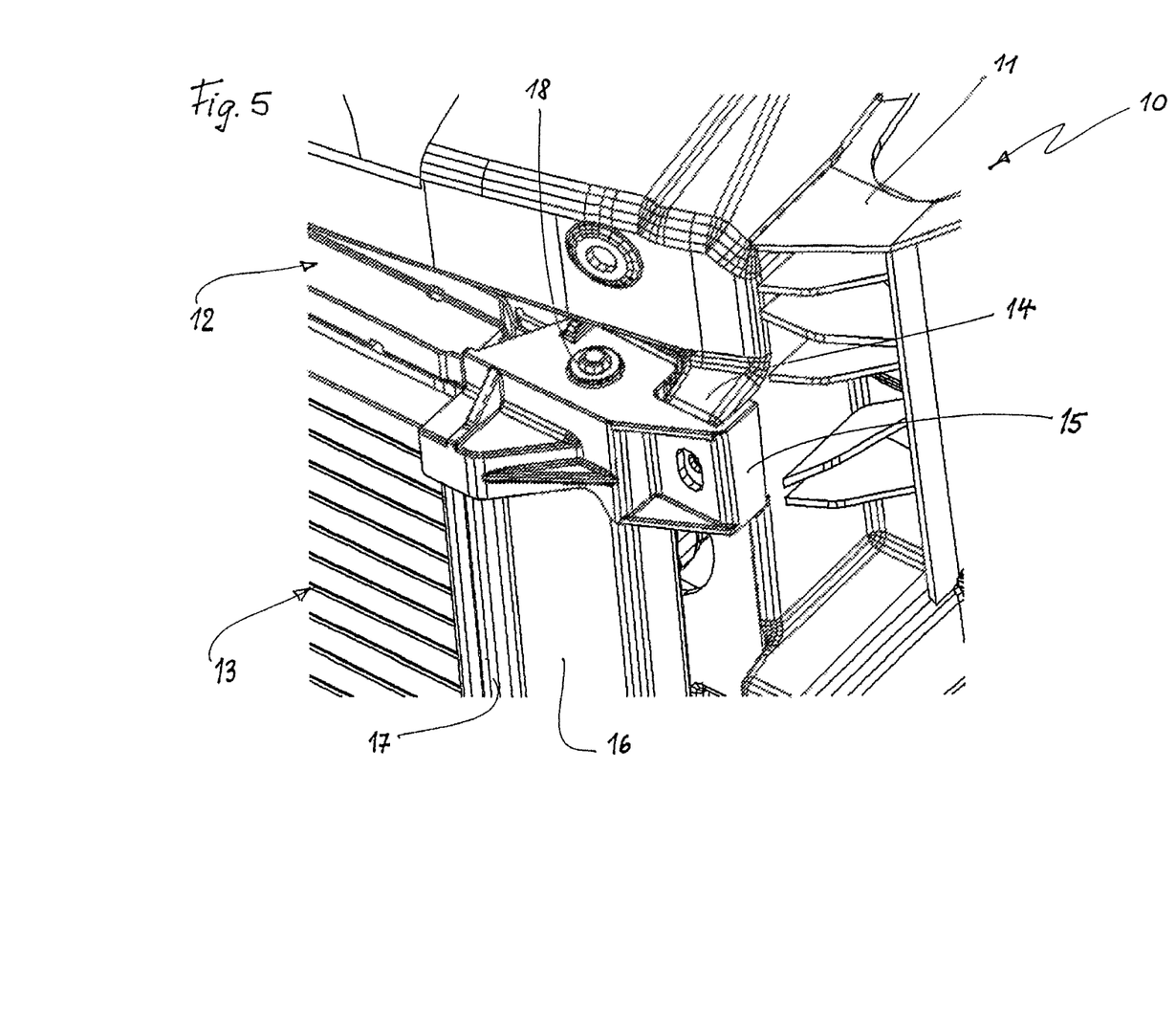
FIG. 5 shows another isometric illustration of the cooling module as per FIG. 4.

FIG. 5 shows the detail of the front module 10 in another perspective, with the same reference symbols again being used for identical parts. It can be seen from the illustration that the fastening and connecting element 15 engages both in a form-fitting manner around the screw dome 14 and also in a form-fitting manner around the coolant tank 16 and the collecting tube 17. An elastic compensating element 18, which is inserted into an end wall of the fastening and connecting element 15, bears—though this is not visible—against the end face of the coolant tank 16 and ensures tolerance compensation of the two heat exchangers 12, 13. Preferably four elements 4 (in part of mirror-symmetrical design) are used for the assembly of the two heat exchangers 12, 13.

Figure 6:
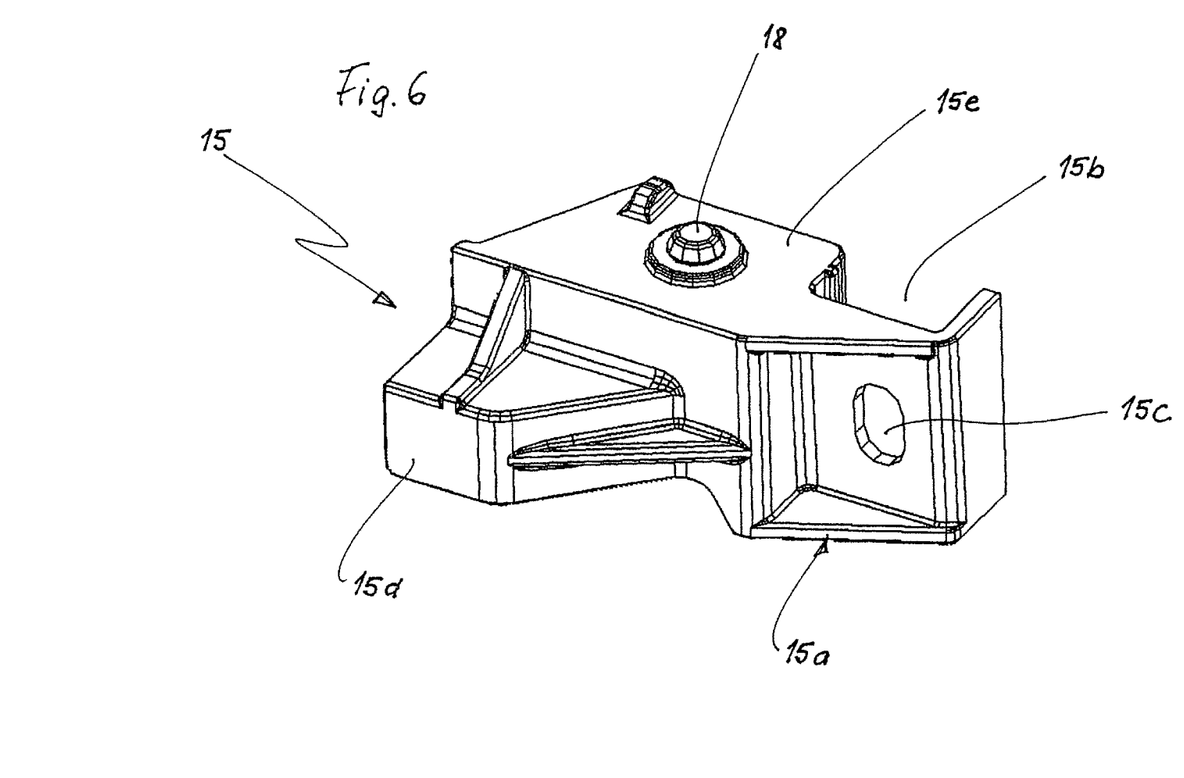
FIG. 6 shows the second exemplary embodiment of the fastening and connecting element according to the invention.

FIG. 6 shows the fastening and connecting element 15 as an individual part in an isometric illustration. The element 15 has a fastening part 15a with a U-shaped profile 15b and a fastening opening 15c. The fastening profile 15b engages over the screw dome 14 (cf. FIG. 5); a self-tapping screw (not illustrated) is inserted through the fastening opening 15c. The element 15 is thereby fastened in a form-fitting and force-fitting manner to the assembly carrier 11. The element 15 also has two pockets 15d, 15e which are provided with two receiving openings—not illustrated here—and which are arranged adjacent to one another. The elastic compensating element 18 is inserted into the pocket 15e.

Figure 7:
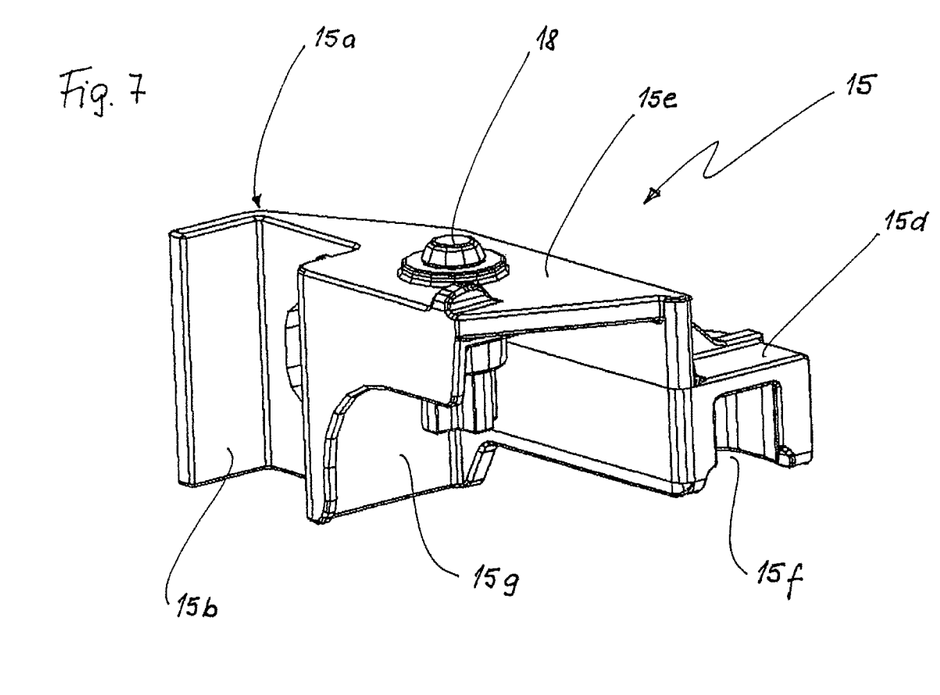
FIG. 7 shows the fastening and connecting element as per FIG. 6 in another isometric illustration.

FIG. 7 shows another perspective of the element 15 which has been rotated approximately through 180° about a vertical axis which corresponds approximately to the axis of the elastic compensating element 18. The same reference symbols are again used for identical parts. In this illustration, it is possible to see the two receiving openings 15f, 15g which are arranged adjacent to one another and which correspond to the pockets 15d, 15e. The elastic compensating element 18 in the pocket 15e ensures compensation of different expansions of the two heat exchangers 12, 13. The shape and size of the two receiving openings 15f, 15g are adapted to the respective heat exchanger or its collecting tanks or collecting tubes. The element 15 can also be produced as a re-usable plastic injection-molded part.

LIST OF REFERENCE SYMBOLS

1 Cooling module
2 Coolant cooler
3 Condenser
4 Fastening and connecting element
4a Fastening part
4b Receiving opening
4c Receiving opening
4d Partition
4e Tank base
4f Opening
5 Latching connection
6 Module carrier
7 Coolant tank (plastic)
8 Screw dome
9 Collecting tube (condenser)
10 Front module
11 Assembly carrier
12 Coolant cooler
13 Condenser
14 Screw dome
15 Fastening and connecting element
15a Fastening part
15b Fastening profile
15c Fastening opening
15d Pocket
15e Pocket
15f Receiving opening
15g Receiving opening
16 Coolant tank (aluminum)
17 Collecting tube
18 Compensating element

The invention claimed is:

1. An arrangement of heat exchangers, comprising:
heat exchangers connected to form a structural unit or a module, in a motor vehicle,
wherein the heat exchangers are connected to one another by fastening and connecting elements and are fastened to an assembly carrier of a front module by the same fastening and connecting elements,
wherein the fastening and connecting elements comprise:
at least one receiving opening receiving a heat exchanger in a form-fitting manner, and
a fastening part with a fastening profile joining to a plastic screw dome that is injection-molded on the assembly carrier,
wherein one of the heat exchangers is a refrigerant condenser with collecting tubes and another of the heat exchangers is a fully-metal heat exchanger with metal collecting tanks, and
wherein the collecting tubes and the metal collecting tanks are held at an end side and in a form-fitting manner by at least two fastening and connecting elements.

2. The arrangement of heat exchangers according to claim 1, wherein the at least one receiving opening of at least one of the fastening and connecting elements comprises first and second receiving openings that are arranged in series and are delimited by a partition.

3. The arrangement of heat exchangers according to claim 1, wherein the at least one receiving opening of at least one of the fastening and connecting elements has a C-shaped profile configured to receive one of the collecting tubes.

4. The arrangement of heat exchangers according to claim 1, wherein the fastening profile of at least one of the fastening and connecting elements is embodied as a U-shaped profile with two parallel limbs.

5. The arrangement of heat exchangers according to claim 1, wherein the fastening profile of at least one of the fastening and connecting elements is configured to be screwed to the screw dome using a self-tapping screw.

6. The arrangement of heat exchangers according to claim 1, wherein the at least one receiving opening of at least one of the fastening and connecting elements comprises a first receiving opening and a second receiving opening arranged adjacent to the first receiving opening,
   wherein the first and second receiving openings of the at least one of the fastening and connecting elements are formed so as to be open at an end side at a same side of the at least one of the fastening and connecting elements, and
   wherein one of the first and second receiving openings of the at least one of the fastening and connecting elements is larger than the other of the first and second receiving openings of the at least one of the fastening and connecting elements.

7. The arrangement of heat exchangers according to claim 6, wherein the one of the first and second receiving openings of the at least one of the fastening and connecting elements forms a spatial angle with at least three contact faces.

8. The arrangement of heat exchangers according to claim 1, wherein an elastic compensating element is configured to be inserted into the at least one receiving opening of at least one of the fastening and connecting elements.

9. The arrangement of heat exchangers according to claim 1, wherein at least one of the fastening and connecting elements is produced in one piece as a plastic injection-molded part.

10. The arrangement of heat exchangers according to claim 1, wherein the at least one receiving opening of at least one of the fastening and connecting elements comprises first and second receiving openings that are formed as pockets.

* * * * *